United States Patent [19]

Wolgemuth et al.

[11] 3,932,354

[45] Jan. 13, 1976

[54] STABILIZATION OF THERMOPLASTIC POLYURETHANES DERIVED FROM CYCLIC NITRILE COMPOUNDS

[75] Inventors: Larry G. Wolgemuth, Cherry Hill; Benjamin C. Wilbur, Williamstown, both of N.J.

[73] Assignee: Atlantic Richfield Company, Los Angeles, Calif.

[22] Filed: Feb. 27, 1974

[21] Appl. No.: 445,522

[52] U.S. Cl....... 260/45.95; 260/45.7 R; 260/45.85; 260/77.5 AA; 260/77.5 B
[51] Int. Cl.² ......................................... C08L 75/00
[58] Field of Search .. 260/77.5 AA, 77.5 B, 45.7 R, 260/77.5 SS, 45.95 P

[56] References Cited

UNITED STATES PATENTS

| | | | |
|---|---|---|---|
| 3,531,425 | 9/1970 | Bank et al............................ | 260/859 |
| 3,652,507 | 3/1972 | Bank et al. ................... | 260/77.5 AB |
| 3,702,320 | 11/1972 | Writok et al. ................... | 260/77.5 B |

*Primary Examiner*—M. J. Welsh
*Attorney, Agent, or Firm*—Coleman R. Reap

[57] ABSTRACT

The thermal stability of urethane-type polymeric compounds prepared from cyclic nitrile compounds and nucleophilic compounds by means of a catalyst system containing an organotin compound is improved by treating the polymeric compounds with a tertiary alcohol.

16 Claims, No Drawings

STABILIZATION OF THERMOPLASTIC POLYURETHANES DERIVED FROM CYCLIC NITRILE COMPOUNDS

BACKGROUND OF THE INVENTION

This invention relates to the preparation of improved polymeric compounds containing one or more urea, urethane or thiourethane groups. More particularly, the invention relates to a method of improving the thermal stability and processability of the above polymeric compounds prepared by tin-containing catalysts.

U.S. Pat. No. 3,652,507 issued to Burk, Jr. et al on Mar. 28, 1973 describes an improved process for preparing urethane-type polymers by the condensation of cyclic nitrile compounds with nucleophilic compounds in the presence of a catalytic system comprised of a first metal selected from the metals of Groups III through V of the Periodic Chart, e.g., tin, and a second metal selected from the metals of Groups I and II and the iron series of Group VIII of the Periodic Chart, for example, an alkali metal. It has been discovered that when certain tin compounds are used in the process disclosed in this patent the polymeric product obtained has a very high molecular weight, making it particularly suitable for use in the manufacture of molded or extruded products. However, when these polymers are subjected to physical processing at elevated temperatures, such as is encountered in milling and molding operations, they have been found to undergo molecular weight reduction which results in a loss of physical properties, thus making the product unsuitable for many uses.

A method has now been discovered for treating urethane-type polymers prepared from catalyst systems containing these tin compounds which overcomes the above difficulty. Thus, urethane-type polymers of very high molecular weight which do not undergo molecular weight reduction upon physical processing at elevated temperatures can be prepared from cyclic nitrile compounds and nucleophilic compounds using catalyst systems containing tin compounds.

Accordingly, it is an object of the invention to present a method of preparing improved urethane-type polymers. It is another object of the invention to present a method of preparing high molecular weight urethane-type polymers which have a reduced tendency to undergo molecular weight degradation during physical processing at elevated temperatures. It is another object of the invention to present a method of improving the thermal stability of urethane-type polymers prepared from cyclic nitrile compounds and nucleophilic compounds by means of a tincontaining catalyst. These and other objects of the invention will become more readily apparent from the following description and examples.

SUMMARY OF THE INVENTION

Urethane-type polymers prepared from cyclic nitrile compounds and nucleophilic compounds are heated with tertiary alcohols containing 4 to 10 carbon atoms. The polymer, which is dissolved or suspended in the tertiary alcohol, is then recovered from the alcohol by any suitable means, for example, by insolubilizing the polymer in the tertiary alcohol as by the addition of a non-solvent such as methanol. The addition of the non-solvent causes the polymer to precipitate out of solution. The treatment of the polymer with the alcohol is carried out at a temperature of about 60° to 170°C. for a period of about 15 minutes to 24 hours, preferably for about 1 to 10 hours. The weight ratio of tertiary alcohol to polymer being treated is preferably about 1 to 20:1. The preferred tertiary alcohol is tertiary butyl alcohol. The process is particularly suitable for the preparation of thermallystable, high molecular weight polyurethanes prepared from cyclic nitrile carbonates and polyols.

DESCRIPTION OF THE INVENTION

According to the invention the thermal stability of certain urethane-type polymers prepared from cyclic nitrile compounds and nucleophilic compounds is improved by contacting the polymer with a tertiary alcohol.

DEFINITIONS

The term urethane-type polymers is used herein to describe the polymeric compounds obtained when a cyclic nitrile compound reacts with a nucleophilic compound to produce a polyurethane, polyurea, polythiourea or mixtures of any or all of these.

The term cyclic nitrile compound is used to describe compounds containing

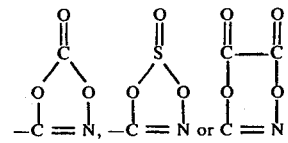

groups.

The term organic nucleophilic group is used herein to describe organic compounds having active hydrogen atoms as determined by the Zerewitinoff test.

The term tertiary alcohol is used to define monohydric alcohols in which the hydroxyl group is attached to a tertiary carbon atom, i.e., one which is attached to three other carbon atoms.

The thermoplastic urethane-type polymers whose thermal stability is improved by this invention are those prepared from cyclic nitrile compounds and nucleophilic compounds using catalyst systems containing an organotin compound as the sole component or as one of the components. These catalytic agents have been found to be particularly useful in the preparation of high molecular weight thermoplastic polymers. However, as mentioned above, polymers prepared using them frequently undergo thermal degradation with a resultant loss in physical properties and such polymers are often unsuitable for high temperature processing operations such as molding, milling or extrusion.

Typical organo tin catalysts used to make the polymers improved by the present invention include:

1. Tin oxides such as dibutyltin oxide, dipropyltin oxide, diphenyltin oxide, tributyltin oxide, tripropyltin oxide, triphenyltin oxide, dibutylpropyltin oxide, dibutylphenyltin oxide, etc.

2. Tin alkoxides such as dibutyltin dimethoxide, dipropyltin diethoxide, diphenyltin dimethoxide, tributyltin methoxide, etc. The preparation and use of tin oxides and tin alkoxides for the preparation of polyurethanes is described in U.S. Pat. No. 3,652,507, incorporated herein by reference.

3. Stannoxanes such as octabutyl-tetraacetoxy stannoxane, octamethyl-tetraformyloxystannoxane, etc. These compounds and their preparation are described in U.S. Pat. No. 3,676,402, incorporated herein by reference.

4. Carboxylic acid salts of tin compounds such as dibutyltin dilaurate, dibutyltin distearate, etc.

The use of these compounds in the preparation of urethanes from cyclic nitrile compounds is described in U.S. Pat. No. 3,702,320, incorporated herein by reference.

Urethane-type polymers prepared from oxygencontaining organotin compounds appear to be the most susceptible to thermal degradation and the improvement of this invention is particularly beneficial in thermally stabilizing these polymers. The reason for the thermal instability of organotin-catalyzed urethane-type polymers is not known with certainty, but it is believed that the polymers contain unreacted catalyst which causes the degradation of the polymers when they are processed at elevated temperatures.

The theory of operation of the invention is not fully understood, but it appears that contacting the polymer with the tertiary alcohol results in the removal and/or deactivation of the catalytic material which caused the thermal instability of the polymer. In any event, it has been found that tertiary alcohol-treated polymers are much more stable at processing temperatures than untreated polymers prepared by the same procedure.

The alcohols useful in the invention are the tertiary alcohols containing up to about 10 carbon atoms. The first tertiary alcohol is tertiary butyl alcohol. This alcohol is preferred because of its low cost and because it has a lower boiling point and is more efficient than alcohols having a higher molecular weight. Alcohols having more than about 10 carbon atoms may perform satisfactorily in the invention, but these are not as desirable because they have higher melting and boiling points than the lower molecular weight alcohols and cannot be used as efficiently as the latter alcohols under ordinary operating conditions. Normal and secondary alcohols are not satisfactory for use in the process of the invention because they are more reactive than tertiary alcohols and often undergo transesterification with ester portions of the polymer, thereby causing a loss in molecular weight with a consequent reduction in physical properties. Tertiary alcohols, on the other hand, do not readily enter into transesterification reactions with the ester groupings of the urethane-type polymers due to steric hindrance caused by the presence of the three alkyl groups attached to the same carbon atom to which is attached the hydroxyl group. Thus, tertiary alcohols are specifically useful for thermally stabilizing urethane-type polymers prepared from cyclic nitrile compounds and nucleophilic compounds by means of catalytic systems containing organotin compounds.

The amount of alcohol used in treating the polymer is not critical and may vary from about an amount equal to the weight of polymer being treated up to considerable excess of alcohol, e.g., up to about 20 or more parts per part by weight of polymer. The use of amounts of alcohol in excess of about 20 parts per part of polymer does not appear to provide any added benefit and, in fact, may be disadvantageous because of the larger equipment necessary to handle such greater amounts. On the other hand, amounts less than about 1 part per part of polymer may not provide for efficient contact between the solvent and the polymer and the results may be inferior to that obtained when operating in the preferred solvent-polymer weight ratio. In other words, the weight ratio of tertiary alcohol to urethane-type polymer is preferably about 1 to 20:1. In the most preferred embodiment the weight ratio of tertiary alcohol to urethane-type polymer is about 1 to 10:1.

The contact between the tertiary alcohol and the urethane-type polymer may take place at any temperature below the degradation temperature of the polymer. It is often preferred that the contacting take place at elevated temperatures since this facilitates more through intermixing of the tertiary alcohol and the polymer. In general, temperatures of about 60° to 170°C. have been found to produce the best results. A convenient temperature is the temperature at which reflux of the tertiary alcohol occurs under the conditions of the alcohol treatment. With higher alcohols it may be necessary to operate the process at subatmospheric pressures to reach the refluxing temperature without reaching the degradation temperature of the polymer. Accordingly, it is frequently preferred to use lower tertiary alcohols in the process of the invention.

The polymer being treated is contacted with the tertiary alcohol for a period of time which preferably varies from about 15 minutes to 24 hours. In general, the time period found to be most suitable will vary depending upon the temperature at which the contacting takes place, the particular tertiary alcohol used in the process and the ratio of alcohol to polymer. Usually, suitable results are obtained in the above stated time period. Time periods greater than about 24 hours are often impractical. It is frequently satisfactory to conduct the alcohol treatment for about 1 to 10 hours.

The polymer may be insoluble, partially or fully soluble in the tertiary alcohol depending upon the particular polymer being treated, the tertiary alcohol used in the process, the relative proportions of alcohol and polymer, the temperature at which the treating process is carried out, etc. The degree of agitation desirable, if any, will depend upon the particular system. In some cases no agitation is necessary; in other cases some agitation may be desirable. Often, refluxing alone may provide a sufficient degree of agitation to produce the desired results.

At the completion of the tertiary alcohol treatment, the polymer is recovered from the tertiary alcohol, preferably by rendering the polymer insoluble in the tertiary alcohol. In some cases the polymer is already insoluble in which case the polymer can be directly separated from the alcohol by filtration. In other cases, the polymer may be insoluble at lower temperatures but soluble at the treatment temperatures. In such cases the mixture is merely cooled, causing the polymer to precipitate out of solution. In still other cases it may be necessary to add a non-solvent for the polymer to the alcohol-polymer mixture to insolubilize the polymer. Typical non-solvents found to be suitable for this purpose include water and lower normal alcohols such as methanol. Since the separation is carried out at lower temperatures, i.e., below about 60°C., transesterification of the methanol and esters in the polymer will not occur.

THE CYCLIC NITRILE COMPOUNDS

The cyclic nitrile compounds used to prepare the polymers whose thermal stability is improved by the invention have the structure

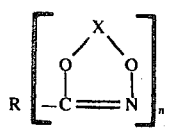

wherein X is carbonyl,

thionyl,

or oxalyl,

n is at least 2 and R is an organic radical having from 2 to about 200,000 carbon atoms and is free of reactive hydrogens as determined by the Zerewitinoff test. A compound which contains a reactive hydrogen as determined by the Zerewitinoff test is one which, when contacted with a Grignard solution of methyl iodine, will effect the liberation of methane by decomposition of the Grignard reagent. Frequently R will consist essentially of carbon and hydrogen atoms and by "consisting essentially of carbon and hydrogen" is meant that the essential composition of the radical is carbon and hydrogen but that there can be included therein other elements as well, so long as they do not materially affect the radical's basic characteristic of being non-interferring in the condensation reaction of the cyclic nitrile group with the reactive hydrogen group. Examples of non-interferring groups which can be present in R and which contain elements other than carbon and hydrogen are alkoxy, nitro, and halo groups. The R radical can be aromatic, e.g., of 1 to 3 aromatic rings (fused or non-fused) or non-aromatic and when the latter, can be cyclic or acyclic and saturated or ethylenically or acetylenically unsaturated. Acyclic R's can be straight or branched chain. The cyclic nitrile carbonate group can be attached to an aromatic ring carbon atom, to a cycloaliphatic ring carbon atom or to a non-ring carbon atom.

R often contains from 2 to 50 carbon atoms when it is aliphatic and from 6 to 30 carbon atoms when it is aromatic. When R has a content in this range, it preferably contains 2 to 12 carbon atoms when aliphatic and 6 to 18 carbon atoms when aromatic. R may also be of much higher molecular weight and may contain up to 200,000 or more carbon atoms. Cyclic nitrile compounds in which R has a high molecular weight may be prepared, for instance, by polymerizing unsaturated cyclic nitrile compounds such as acrylonitrile carbonate. The preparation of cyclic nitrile compounds of this type is disclosed in U.S. Pat. No. 3,480,595, the disclosure of which is incorporated herein by reference.

The number of cyclic nitrile functional groups present in the cyclic nitrile compounds used to prepare the thermoplastic polymers of the invention usually varies from 2 to about 6. In preparing very high molecular weight polymers, it is usually desirable than n be about 2 to 3.

The preparation of the cyclic nitrile compounds useful in the invention forms no part of the invention, and one desiring to explore their preparation may refer to the above-mentioned patents and U.S. Pat. Nos. 3,480,595; 3,507,900; 3,609,163; 3,652,507; and 3,658,805, all of which are incorporated herein by reference.

Typical of the aliphatic cyclic nitrile compounds useful in the invention are:

1. Saturated aliphatic and cycloaliphatic compounds such as 1,2-ethane di(nitrile carbonate); 1,4-butane di(nitrile carbonate); 1,4-butane di(nitrile sulfite); 1,20-eicosane di(nitrile oxalate); 1,40-tetracontane di(nitrile carbonate); 5-ethyl-1, 16-hexadecane di(nitrile carbonate); 1,4-cyclohexane di(nitrile carbonate).

2. Unsaturated aliphatic and cycloaliphatic compounds such as 1,2-ethene-di(nitrile carbonate); 1,4-butene-2-di(nitrile sulfite); 1,4-butyne-2-di(nitrile carbonate); 1,6-hexyne-2-di(nitrile carbonate); 1,4-cyclohexene-2-di(nitrile carbonate); etc.

3. Aromatic compounds such as benzene 1,3-di(nitrile carbonate); benzene-1,4-di(nitrile carbonate); and 1,3-diethylbenzene-2,4-di(nitrile oxalate); methylbenzene-di(nitrile carbonate); 1-benzylbenzene-2,4-di(nitrile carbonate); naphthalene-1,7-di(nitrile carbonate); 1,2,3,4-tetrahydronaphthalene-di(nitrile carbonate); 2,2-diphenylpropane-p,p'-di(nitrile carbonate); diphenylmethane-p,p'-di(nitrile carbonate); anthracene-2,8-di(nitrile carbonate); 1,2-diphenylethane-p,p'-di(nitrile carbonate); biphenyl-di(nitrile carbonate); 1,2-diphenylethane-o,o'-di(nitrile oxalate); stilbene-p,p'-di(nitrile carbonate); and stilbene-o,o'-di(nitrile sulfite).

Although cyclic nitrile sulfites and cyclic nitrile oxalates function as well as, and sometimes better than, cyclic nitrile carbonates, they are not as suitable as cyclic nitrile carbonates since the sulfites produce sulfur dioxide, an obnoxious and toxic gas, and the oxalates produce carbon monoxide, also a very toxic gas. Since the carbonates, upon reaction, release harmless and odorless carbon dioxide, these are much more suitable for general use. Thus, the preferred cyclic nitrile compounds are the saturated aliphatic cyclic nitrile carbonates in which R contains 2–12 carbon atoms, such as 1,2-ethane di(nitrile carbonate); and 1,4-butane di(nitrile carbonate).

THE NUCLEOPHILIC COMPOUNDS

Suitable organic nucleophilic compounds used in the preparation of the improved compounds of the invention include compounds having the active hydrogen present in —OH, —NH—, —NH$_2$—, —SH, —SO$_2$NH$_2$, —SO$_2$OH, —COOH, —CSNH$_2$, and —CONHR groups. The organic nucleophilic compounds preferred for use in the invention include aliphatic and aromatic polyols, polyamines, and polythiols, and polymers such as polyester polyols, polyamines or polythiols, polyether polyols, polyamines or polythiols, and polylactones and similar compounds having from 2 to 6 or more —OH, —NH—, NH$_2$, or —SH groups or mixtures of these per molecule and having 2 to about 100,000 carbon atoms with hydroxyl numbers ranging from 12 to 1,100 or more. Mixtures of two or more of these compounds can also be employed.

The aliphatic and aromatic polyols, polyamines, and polythiols include, for example, ethylene glycol; diethylene glycol; thiodiethylene glycol; propylene glycol; 1,3-butylene glycol; 1,6-hexanediol; butenediol; butynediol; amylene glycols; 2-methyl-pentanediol-2,4; 1,7-heptanediol; glycerine; neopentyl glycol; trimethylol propane; pentaerythritol; cyclohexane dimethanol; sorbitol; mannitol; glactitol; talitol; xylitol; 1,2,5,6-tetrahydroxyhexane; styrene glycol; bis(hydroxyethyl) diphenyl-diemethylmethane; silanediols, e.g., triphenyl silanols; 1,4-dihydroxybenzene; etc., and the corresponding amine- and thiol-containing compounds.

The polyhydroxyl-, amine- or thiol-containing polymeric compounds useful in this invention include, for instance, polyhydric polyalkylene ethers, polyhydroxyl polyesters, and hydroxyl group-containing, preferably hydroxyl-group terminated, polymers and the corresponding amine and thiol-containing polymers. The polyhydric, polyamine or polythiol polyalkylene ethers may have a molecular weight greater than about 350 and a hydroxyl number of from about 10 to 600 and may be derived, for example, by the polymerization of alkylene oxides, such as ethylene oxide, propylene oxide, butylene oxide, and the like. Polyhydric polyalkylene ethers may also be prepared by the polymerization of the cyclic ethers, such as, for example, dioxane, tetrahydrofuran, and the like, and by the condensation of an alkylene oxide with a glycol, such as ethylene glycol, propylene glycol, butylene glycol, and the like.

The hydroxyl-, amine-, and thiol-containing polyesters may be obtained by the reaction of aliphatic or aromatic dicarboxylic acids with aliphatic or aromatic polyhydric, polyamine or polythiol alcohols in the manner well known to the art in proportions that result in esters having at least two reactive hydroxy, amino or mercaptan groups. Any polyols, polyamine or polythiol alcohols may be used to form the esters, aminoesters, and thio-esters and illustrative of such alcohols, amines, and thiols are those listed above in the discussion of suitable alcohols, amines, and thiols as the active hydrogen-containing reactant. Included within the suitable esters, aminoesters, and hydroxyl-containing thioesters are the mono and diglycerides of castor oil, tall oil, soya oil, linseed oil, etc., and the corresponding amine and thio esters. The latter esters, aminoesters, and thioesters are usually prepolymers prepared by the reaction of the fatty glyceride with low molecular weight polyhydric, polyamine or polythiol alcohols. Illustrative, for instance, of castor oil-based prepolymers are propylene glycol monoricinoleate, propylene glycol mono-12-hydroxystearate, neopentyl glycol monoricinoleate, dehydrated castor oil, ethylene glycol monoricinoleate, ethylene glycol mono-12-hydroxystearate, triglyceride or ricinoleic acid, epoxidized castor oil, and pentaerythitol tetraricinoleate and the corresponding amine and thiol prepolymers. Other suitable polymers, such as those derived from 1,4-butadiene; isoprene; 2,3-dimethylbutadiene; 2-chloro-1,3-butadiene; 2-cyano-1,3-butadiene; and other polymerizable ethylenically unsaturated monomers such as $\alpha$-olefins of up to 12 carbon atoms such as ethylene, propylene, butene, etc.; styrene acrylonitrile, acrylic acid or ester, methacrylic acid or ester, vinyl chloride, vinylidine chloride, and the like; hydroxyl-terminated condensates of phenol and lower aldehydes and hydroxy-terminated polyepoxides. A particularly suitable hydroxyl-containing compound is styrene-vinyl alcohol copolymer, made by copolymerizing styrene and vinyl acetate and partially or fully hydrolyzing the acetate groups to alcohol groups.

The preferred compounds are the polyols, particularly the polyester and polyether polyols.

The functionality of the cyclic nitrile component and the organic nucleophilic component is at least 2. It is often desirable that the functionality of one or both of the reacting components be higher than 2. In general, it is preferred that the cyclic nitrile compounds used have a functionality of two and the functionality of the organic polyols, polyamines or polythiols be varied since it is much more economical to prepare polyfunctional hydroxyl amine, and thiol compounds than polyfunctional cyclic nitrile compounds.

The ratio of cyclic nitrile compound to organic polyol or polythiol compounds may vary depending upon the desired properties of the product and the functionality of the reacting materials. In general, it is desired to use amounts of cyclic nitrile compound and organic polyhydroxyl, amine and/or polythiol compounds that will provide a ratio of cyclic nitrile functional group to total polyhydroxyl, polyamine, and polythiol groups of about 0.7 to 10:1 and preferably about 0.7 to 1.4:1. The same ratios apply when using a prepolymer and additional monomer in the composition, i.e., the ratio of the component having the reactive cyclic nitrile groups to the component having the reactive hydrogen-containing groups is desirably such that there are 0.7 to 10 and preferably 0.7 to 1.4 cyclic nitrile functional groups per each reactive hydrogen-containing group in the composition.

The details of the polymerization of the above materials are well known and are fully described in U.S. Pat. No. 3,652,507, the disclosure of which is incorporated herein by reference.

In a typical operation the polymer being treated is mixed with the tertiary alcohol and the temperature is raised to about 60° to 170°C., for example, to the refluxing temperature of the alcohol. The mixture is held in this temperature, preferably with agitation for the desired treatment period and then cooled. The polymer is rendered insoluble in the solvent, if necessary, by the addition of a non-solvent for the polymer to the mixture. The polymer is then separated from the alcohol and non-solvent and dried.

Polymers treated in accordance with this invention have excellent high temperature stability and are well adapted for high temperature operations such as molding, milling, etc.

The following examples illustrate specific embodiments of the invention. In these examples parts and percentages are on a weight basis unless otherwise indicated.

EXAMPLE I

A polyurethane polymer prepared by reacting 30 mol % of a tetramethylene ether glycol, and 20 mol % of 1,4-butanediol with 50 mol % adipodi(nitrile carbonate) in the presence of 0.5 weight percent dibutyltin oxide and 0.5 weight percent sodium stearate has an inherent viscosity (determined by dissolving 0.2 gm of polymer in 100 ml. of dimethyl formamide and determining inherent viscosity at 30°C.) of 0.82.

A portion (40g.) of the above polymer is refluxed 18 hours in 700 ml. of t-butyl alcohol then precipitated from solution by adding methanol until no further precipitation occurs. The precipitate is then dried and milled for 5 minutes at 260°F. during which time 0.5% of an antioxidant (octadecyl-3-(3'-5'-di-tertiary butyl-4'-hydroxyl phenyl) propionate is added. The polymer is then molded for 20 minutes at 260°F. The molded polymer has an inherent viscosity of 0.81.

EXAMPLE A (COMPARATIVE)

A portion of the untreated polymer prepared in Example I is milled for 5 minutes at 260°F. during which time 0.5% of an antioxidant (octadecyl-3-(3',5'-di-tertiary butyl-4'-hydroxylphenyl) propionate is added. The polymer is then molded for 20 minutes at 260°F. The molded polymer has an inherent viscosity of 0.57.

The above examples illustrate that polyurethane prepared from a cyclic nitrile carbonate and a polyol using an organotin catalyst changes very little in inherent viscosity during molding at an elevated temperature when the polymer is contacted with tertiary butyl alcohol prior to molding whereas the same polyurethane when not treated with the tertiary butyl alcohol undergoes considerable inherent viscosity reduction when molded at elevated temperature.

Although the invention has been described with particular reference to specific examples, it is understood the breadth of the invention is not limited thereto but is determined by the scope of the appended claims.

We claim:

1. In a process for preparing polymers containing urethane, urea or thiourethane groups from cyclic nitrile compounds containing

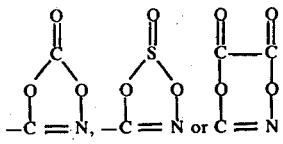

groups and nucleophilic compounds having active hydrogen atoms using a catalyst system comprising an organotin compound, the improvement comprising heating the polymeric product with a tertiary alcohol containing 4 to 10 carbon atoms for ¼ to 24 hours and recovering the polymer from the tertiary alcohol by insolubilizing it in the tertiary alcohol.

2. The process of claim 1 wherein said tertiary alcohol contains 4 to 6 carbon atoms.

3. The process of claim 2 wherein said tertiary alcohol is tertiary butyl alcohol.

4. The process of claim 1 wherein the polymeric product and tertiary alcohol are maintained at a temperature of about 60° to 170°C. for about 1 to 10 hours.

5. The process of claim 4 wherein said temperature is the refluxing temperature.

6. The process of claim 1 wherein the weight ratio of alcohol to polymer is about 1 to 20:1.

7. The process of claim 1 wherein the polymer is insolubilized in the tertiary alcohol by the addition of a non-solvent for the polymer to the mixture.

8. The process of claim 1 wherein the polymer is insolubilized in the tertiary alcohol by the addition of methanol or water to the mixture.

9. A process for preparing thermoplastic polymers containing urethane, urea or thiourethane groups having improved thermal stability comprising:

a. Condensing-rearranging a cyclic nitrile compound containing

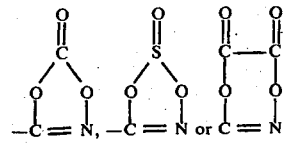

groups and a nucleophilic compound having reactive hydrogen atoms in the presence of a catalyst comprised of an organotin compound to form a thermoplastic polymer.

b. Contacting said thermoplastic polymer with about 1 to 20 parts by weight of a tertiary alcohol per part of polymer at a temperature of about 60° to 170°C. for about ¼ to 24 hours.

c. Insolubilizing the polymer in the tertiary alcohol, and d. Separating the polymer from the tertiary alcohol.

10. The process of claim 9 wherein said cyclic nitrile compound is a cyclic nitrile carbonate and said nucleophilic compound is a polyol.

11. The process of claim 10 wherein said cyclic nitrile carbonate is adipodi(nitrile carbonate).

12. The process of claim 11 wherein said alcohol is tertiary butyl alcohol.

13. The process of claim 12 wherein said polymer is refluxed with said tertiary butyl alcohol for about 1 to 10 hours.

14. The process of claim 13 wherein said insolubilizing is effected by the addition of methanol or water to the polymer-tertiary butyl alcohol mixture.

15. The process of claim 9 wherein the weight ratio of tertiary alcohol to polymer is about 1 to 10:1.

16. The process of claim 9 wherein said organotin compound is an oxygen-containing tin compound.

* * * * *